United States Patent [19]
Kimura

[11] 4,323,302
[45] Apr. 6, 1982

[54] WIDE-ANGLE ZOOM LENS SYSTEM

[75] Inventor: Tadashi Kimura, Tokyo, Japan

[73] Assignee: Olympus Optical Co., Ltd., Tokyo, Japan

[21] Appl. No.: 125,050

[22] Filed: Feb. 27, 1980

[30] Foreign Application Priority Data

Mar. 2, 1979 [JP] Japan ................... 54/24901

[51] Int. Cl.³ ............................................. G02B 15/14
[52] U.S. Cl. .................................................. 350/426
[58] Field of Search ........................................ 350/426

[56] References Cited
U.S. PATENT DOCUMENTS 4,074,931  2/1978  Okudaira .......................... 350/426

Primary Examiner—F. L. Evans
Attorney, Agent, or Firm—Cushman, Darby & Cushman

[57] ABSTRACT

A wide-angle zoom lens system comprising a front lens group consisting of a first negative meniscus lens component, a second negative lens component and a third positive lens component, and a rear lens group consisting of a fourth positive lens component, a fifth positive meniscus lens component, a sixth negative lens component and a seventh positive lens component. Said zoom lens system is so adapted as to permit changing focal length of the entire lens system as a whole by varying the airspace reserved between said front and rear lens groups, and has a wide field angle of 73.4° at the wide position, a high zoom ratio of 1.62 and an aperture ratio of F/3.2 assuring brightness sufficient for practical use.

10 Claims, 26 Drawing Figures

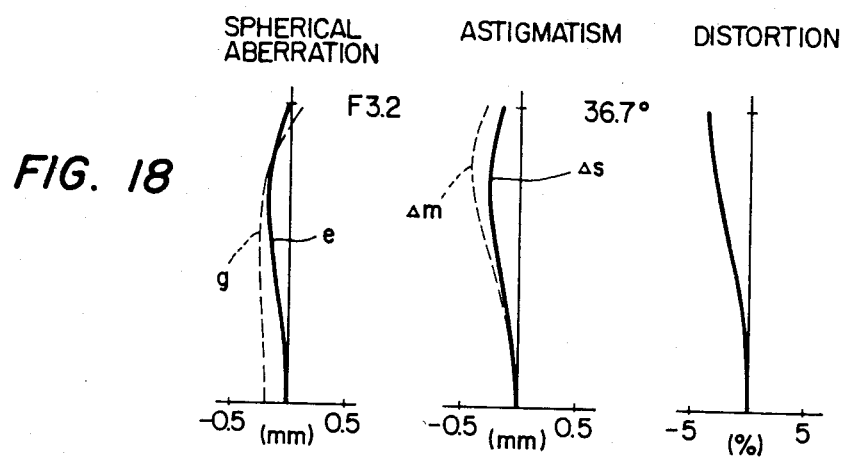
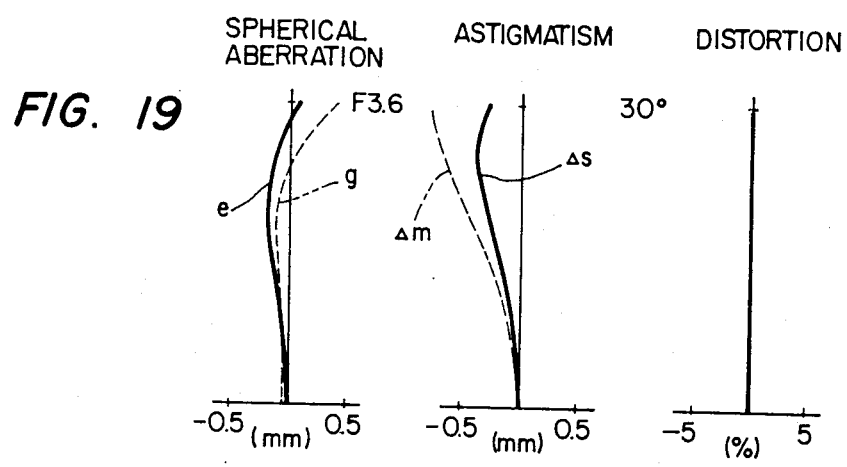
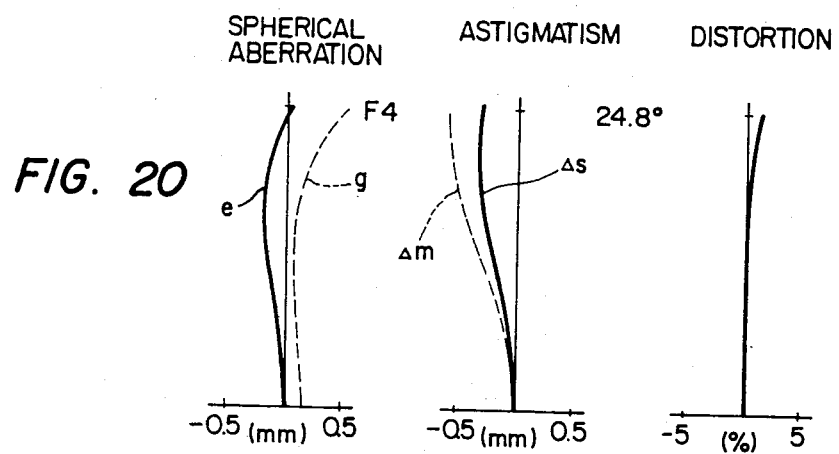

WIDE-ANGLE ZOOM LENS SYSTEM

BACKGROUND OF THE INVENTION (a) Field of the invention

The present invention relates to a zoom lens system and, more specifically to a compact, light-weight and wide-angle zoom lens system having sufficient wide-angle effect and zooming effect.

(b) Description of the prior art

There are known several examples of the conventional zoom lens systems comprising seven lens components like the zoom lens system according to the present invention. One of these zoom lens systems is designed for a bright aperture ratio of F/2.8 and a zoom ratio of 1.9 to assure sufficient zooming effect. However, this zoom lens system has a narrow field angle of 64.6° at the wide position and cannot provide a sufficient effect of wide angle. Another example of the conventional zoom lens systems is also designed for a sufficient zoom ratio of 1.67 to 1.85 but has a narrow field angle of approximately 53° at the wide position, thereby incapable of providing sufficient effect of wide angle.

SUMMARY OF THE INVENTION

A general object of the present invention is to provide a wide-angle zoom lens system which can assure sufficient effect of wide angle as large as 73.4° at the wide position in combination with various aberrations favorably corrected while maintaining sufficient zooming effect with a zoom ratio of 1.62 and aperture ratio of F/3.2 for brightness sufficient for practical use.

The wide-angle zoom lens system according to the present invention comprises seven lens elements, as shown in FIG. 1 and FIG. 2, i.e., a front lens group consisting of a first negative meniscus lens component having a convex surface on the object side, a second negative meniscus lens component having a convex surface on the object side or biconcave lens component and a third positive lens component, and a rear lens group consisting of a fourth positive lens component, a fifth positive meniscus lens component having a convex surface on the object side, a sixth negative lens component and a seventh positive lens component. Said zoom lens system comprises an airspace reserved between each pair of neighboring lens components and has such a composition as to permit changing focal length of the entire lens system as a whole by varying the airspace reserved between said front lens group and said rear lens group. Moreover, the zoom lens system according to the present invention is so adapted as to satisfy the following conditions:

(1) $1.68 < n_1, n_2$
(2) $n_4, n_5 < 1.65$
(3) $1.75 < n_6$ $$0.43 < \frac{d_1 + d_2 + d_3}{f} < 0.82 \quad (4)$$

(5) $1.6 < |r_6|/f$ wherein the reference symbols are defined as follows:

$n_1, n_2, n_4, n_5$ and $n_6$: refractive indices of the first, second, fourth, fifth and sixth lens components respectively for the d line $d_1$ and $d_3$: thicknesses of the first and second lens components respectively $d_2$: airspace reserved between the first and second lens components $r_6$: radius of curvature on the image side surface of the third lens component $f$: focal length of the entire lens system as a whole at wide position Now, significance of the above-mentioned conditions will be described consecutively below.

The condition (1) relates to material for the first and second lens components. If $n_1$ or $n_2$ is smaller than 1.68 defined as the lower limit of the condition (1), Petzval's sum will be very small to aggravate curvature of field, and astigmatic difference will degrade image formation performance.

The above descriptions also apply to the conditions (2) and (3). That is to say, the condition (2) defines material for the fourth and fifth lens components. If $n_4$ or $n_5$ is larger than 1.65, Petzval's sum will be very small to aggravate curvature of field, and astigmatic difference will degrade image formation performance. The condition (3) relates to material for the sixth lens component. If $n_6$ is smaller than 1.75 defined as the lower limit of the condition (3), Petzval's sum will be too small, thereby aggravating curvature of field, and astigmatic difference will degrade image formation performance. The above-described conditions (1) through (3) are effective for preventing Petzval's sums from being made smaller than necessary due to the fact that the negative lens components have power stronger than that of the positive lens components as a result from a wide angle of field of approximately 74° selected at the wide position.

If $n_1$ or $n_2$ is smaller than 1.68 in the condition (1) and $n_6$ is smaller than 1.75 in the condition (3), $r_1, r_2, r_3, r_4, r_{11}$ and $r_{12}$ will be small enough to aggravate spherical aberration. If it is attempted to correct the spherical aberration by bending on the surfaces of the other lens components, offaxial coma will be aggravated unpreferably.

The condition (4) is required mainly for designing a compact zoom lens system. If the upper limit of the condition (4) is exceeded, the front lens groups will unavoidably be enlarged and have a long back focal length, thereby making it impossible to obtain a sufficient zoom ratio. If it is attempted to correct this defect by changing radii of curvature on the surfaces of the lens components, $|f_I|$ or $|r_6|$ will be minimized. When $f_I$ or $r_6$ has a small value, favorable correction of a single type of aberration will result in aggravation of the other types of aberrations. When spherical aberration, for example, is corrected favorably, coma, astigmatism, etc. will be aggravated. When coma is corrected favorably, in contrast, spherical aberration, astigmatism, etc. will be aggravated. A small value of $f_I$ or $r_6$ is undesirable for correction of aberrations since it makes it impossible to correct all the types of aberrations favorably at the same time. If the lower limit of the condition (4) is exceeded, the front lens group will have a short back focal length and a long total length. In order to shorten the total length of the front lens group, it is required to change imaging magnification of the rear lens group and shorten focal length $f_{II}$ of the rear lens group, but such changes are undesirable for correction of aberrations for the same reasons as those described above. When it is attempted to obtain sufficient quantity of offaxial marginal rays at the wide position, each of the lens components arranged in the front lens group will have a large effective diameter, which will in turn be undesirable for designing a compact zoom lens system.

If $r_6/f$ is larger than 1.6 in the condition (5), the front lens group will have a long back focal length, thereby making it impossible to obtain a sufficient zooming ratio. When it is attempted to shorten the back focal length by changing radii of curvature only on the surfaces of the respective lens components, $r_2$, $|r_3|$ and $r_4$ will have small values which are undesirable for correction of aberration as already described with reference to the condition (4).

By designing a zoom lens system so as to satisfy the above-described conditions (1) through (5), it is possible to obtain a compact and wide-angle zoom lens system which assures sufficient wide-angle effect and zooming effect, and is sufficiently bright for practical use without producing shade even in case of use with a focusing glass such as micro prism. However, aberrations will be corrected more favorably in said zoom lens system when it is so designed as to satisfy the additional conditions given below:

$$0.35 < \frac{d_7 + d_9 + d_{11}}{f} < 0.7 \qquad (6)$$

(7) $n_7 < 1.65$
(8) $0.6 < r_9/f < 0.83$
(9) $1 < r_4/r_5 < 2.4$ wherein the reference symbols are defined as follows:

$d_7$, $d_9$ and $d_{11}$: thicknesses of the fourth, fifth and sixth lens components respectively $r_4$, $r_5$ and $r_9$: radii of curvature on the image side surface of the second lens component, the object side surface of the third lens component and the object side surface of the fifth lens component respectively Now, significance of the conditions (6) through (9) will be described below.

$(d_7 + d_9 + d_{11})/f$ exceeding the upper limit of the condition (6) will be advantageous for correcting coma and lateral chromatic aberration. In this case, however, it will unavoidably enlarge the entire lens system as a whole and is disadvantageous for designing a compact zoom lens system. If the lower limit of the condition (6) is exceeded, in contrast, coma and lateral chromatic aberration will be aggravated at the wide position, thereby making it impossible to obtain sufficient zooming ratio and favorable aberration characteristics.

In the condition (7), if $n_7$ is larger than 1.65, Petzval's sum will be small enough to aggravate curvature of field and astigmatic difference will be produced to degrade image formation performance.

In the condition (8), if $r_9/f$ exceeds the upper limit, spherical aberration will be undercorrected. When it is attempted to correct spherical aberration by bending of the other lens components, offaxial coma will be aggravated. If the lower limit of the condition (8) is exceeded, spherical aberration will be overcorrected and, in addition, offaxial coma will be aggravated at the wide position, thereby causing disadvantage for correcting aberrations and making it impossible to obtain sufficient zooming ratio.

In the condition (9), if $r_4/r_5$ exceeds the upper limit, coma will be aggravated at intermediate angles of field. If the lower limit of the condition (9) is exceeded, $d_4$ will be too large for an adequate lens composition and spherical aberration will be overcorrected.

By designing a zoom lens system so as to satisfy the above-described conditions (6) through (9) in addition to the conditions (1) through (5), it is possible to obtain a compact, light-weight wide-angle zoom lens system in which coma, lateral chromatic aberration, curvature of field and spherical aberration are corrected very favorably, sufficient wide angle effect and zooming ratio are assured, and sufficient quantity of marginal rays are obtained.

BRIEF DESCRIPTION OF THE DRAWINGS

FIG. 18, FIG. 19 and FIG. 20 show curves illustrating the aberration characteristics of the sixth embodiment;

DESCRIPTION OF THE PREFERRED EMBODIMENTS

Figure 1:
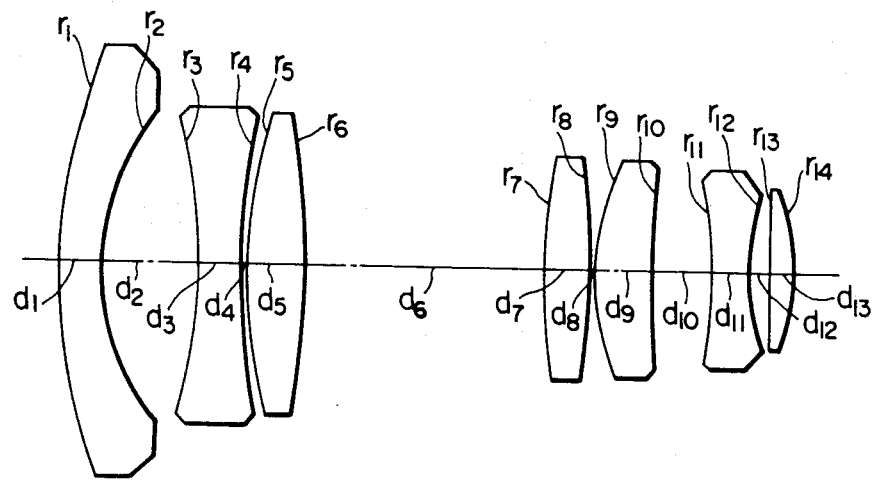
FIG. 1 shows a sectional view illustrating the composition of the lens systems preferred as first, second, third, fourth, sixth, seventh and eighth embodiment of the present invention.
Figure 2:
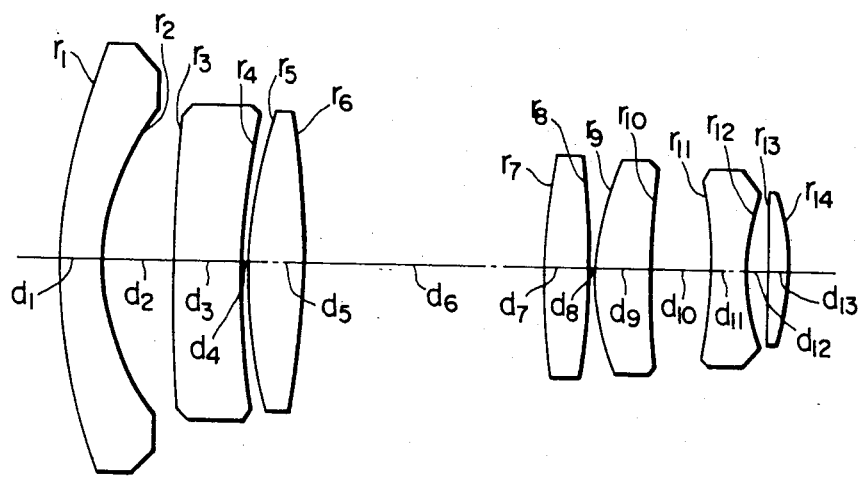
FIG. 2 shows a sectional view illustrating the composition of the lens system preferred as fifth embodiment of the present invention.

Now, numerical data for some preferred embodiments of the present invention will be described below:

| Embodiment 1 | | | |
|---|---|---|---|
| | $f = 1$ | $2\omega = 73.4°$ | |
| $r_1 = 1.7061$ | | | |
| | $d_1 = 0.134$ | $n_1 = 1.80610$ | $\nu_1 = 40.95$ |
| $r_2 = 0.6154$ | | | |
| | $d_2 = 0.284$ | | |
| $r_3 = -2.1733$ | | | |
| | $d_3 = 0.138$ | $n_2 = 1.80610$ | $\nu_2 = 40.95$ |
| $r_4 = 2.2662$ | | | |
| | $d_4 = 0.025$ | | |
| $r_5 = 1.3015$ | | | |
| | $d_5 = 0.155$ | $n_3 = 1.72342$ | $\nu_3 = 37.95$ |
| $r_6 = -2.9799$ | | | |
| | $d_6 = 0.034 \sim 0.772$ | | |
| $r_7 = 1.4473$ | | | |
| | $d_7 = 0.306$ | $n_4 = 1.62012$ | $\nu_4 = 49.66$ |
| $r_8 = -2.3949$ | | | |
| | $d_8 = 0.014$ | | |
| $r_9 = 0.6876$ | | | |
| | $d_9 = 0.123$ | $n_5 = 1.62374$ | $\nu_5 = 47.10$ |
| $r_{10} = 2.3736$ | | | |
| | $d_{10} = 0.116$ | | |
| $r_{11} = -1.7497$ | | | |
| | $d_{11} = 0.173$ | $n_6 = 1.78470$ | $\nu_6 = 26.22$ |
| $r_{12} = 0.7017$ | | | |
| | $d_{12} = 0.052$ | | |

-continued
Embodiment 1

| | $f = 1$ | $2\omega = 73.4°$ | |
|---|---|---|---|
| $r_{13} = 7.1837$ | $d_{13} = 0.069$ | $n_7 = 1.61340$ | $\nu_7 = 43.84$ |
| $r_{14} = -0.7438$ | | | |
| | $f_I = -1.633$ | $f_{II} = 1.182$ | $f_{BW} = 1.329$ |

Embodiment 2

| | $f = 1$ | $2\omega = 73.4°$ | |
|---|---|---|---|
| $r_1 = 2.0924$ | | | |
| | $d_1 = 0.152$ | $n_1 = 1.74400$ | $\nu_1 = 44.73$ |
| $r_2 = 0.6377$ | | | |
| | $d_2 = 0.250$ | | |
| $r_3 = -2.4324$ | | | |
| | $d_3 = 0.172$ | $n_2 = 1.73400$ | $\nu_2 = 51.45$ |
| $r_4 = 1.6607$ | | | |
| | $d_4 = 0.040$ | | |
| $r_5 = 1.2417$ | | | |
| | $d_5 = 0.155$ | $n_3 = 1.72342$ | $\nu_3 = 37.95$ |
| $r_6 = -3.4749$ | | | |
| | $d_6 = 0.034 \sim 0.761$ | | |
| $r_7 = 1.6372$ | | | |
| | $d_7 = 0.196$ | $n_4 = 1.62330$ | $\nu_4 = 53.20$ |
| $r_8 = -1.9165$ | | | |
| | $d_8 = 0.0139$ | | |
| $r_9 = 0.7335$ | | | |
| | $d_9 = 0.101$ | $n_5 = 1.62299$ | $\nu_5 = 58.14$ |
| $r_{10} = 3.2318$ | | | |
| | $d_{10} = 0.101$ | | |
| $r_{11} = -1.6623$ | | | |
| | $d_{11} = 0.287$ | $n_6 = 1.78470$ | $\nu_6 = 26.22$ |
| $r_{12} = 0.7394$ | | | |
| | $d_{12} = 0.052$ | | |
| $r_{13} = -17.2781$ | | | |
| | $d_{13} = 0.069$ | $n_7 = 1.61340$ | $\nu_7 = 43.84$ |
| $r_{14} = -0.6832$ | | | |
| | $f_I = -1.633$ | $f_{II} = 1.182$ | $f_{BW} = 1.339$ |

Embodiment 3

| | $f = 1$ | $2\omega = 73.4°$ | |
|---|---|---|---|
| $r_1 = 1.7925$ | | | |
| | $d_1 = 0.134$ | $n_1 = 1.79952$ | $\nu_1 = 42.24$ |
| $r_2 = 0.6226$ | | | |
| | $d_2 = 0.289$ | | |
| $r_3 = -2.2268$ | | | |
| | $d_3 = 0.138$ | $n_2 = 1.79952$ | $\nu_2 = 42.24$ |
| $r_4 = 2.2176$ | | | |
| | $d_4 = 0.026$ | | |
| $r_5 = 1.3072$ | | | |
| | $d_5 = 0.155$ | $n_3 = 1.72342$ | $\nu_3 = 37.95$ |
| $r_6 = -3.0081$ | | | |
| | $d_6 = 0.034 \sim 0.739$ | | |
| $r_7 = 1.4045$ | | | |
| | $d_7 = 0.307$ | $n_4 = 1.62012$ | $\nu_4 = 49.66$ |
| $r_8 = -2.5521$ | | | |
| | $d_8 = 0.014$ | | |
| $r_9 = 0.7186$ | | | |
| | $d_9 = 0.123$ | $n_5 = 1.63303$ | $\nu_5 = 47.10$ |
| $r_{10} = 2.8869$ | | | |
| | $d_{10} = 0.120$ | | |
| $r_{11} = -1.5473$ | | | |
| | $d_{11} = 0.172$ | $n_6 = 1.80603$ | $\nu_6 = 26.22$ |
| $r_{12} = 0.7323$ | | | |
| | $d_{12} = 0.052$ | | |
| $r_{13} = 12.8440$ | | | |
| | $d_{13} = 0.069$ | $n_7 = 1.63930$ | $\nu_7 = 44.88$ |
| $r_{14} = -0.7237$ | | | |
| | $f_I = -1.633$ | $f_{II} = 1.182$ | $f_{BW} = 1.332$ |

Embodiment 4

| | $f = 1$ | $2\omega = 73.4°$ | |
|---|---|---|---|
| $r_1 = 1.7093$ | | | |
| | $d_1 = 0.152$ | $n_1 = 1.78590$ | $\nu_1 = 44.18$ |
| $r_2 = 0.6094$ | | | |
| | $d_2 = 0.255$ | | |
| $r_3 = -1.8798$ | | | |
| | $d_3 = 0.155$ | $n_2 = 1.75700$ | $\nu_2 = 47.87$ |
| $r_4 = 1.9607$ | | | |
| | $d_4 = 0.034$ | | |
| $r_5 = 1.3051$ | | | |
| | $d_5 = 0.155$ | $n_3 = 1.72342$ | $\nu_3 = 37.95$ |
| $r_6 = -2.6389$ | | | |
| | $d_6 = 0.034 \sim 0.765$ | | |
| $r_7 = 1.5830$ | | | |
| | $d_7 = 0.209$ | $n_4 = 1.62230$ | $\nu_4 = 53.20$ |
| $r_8 = -1.9994$ | | | |
| | $d_8 = 0.014$ | | |
| $r_9 = 0.729$ | | | |
| | $d_9 = 0.101$ | $n_5 = 1.62280$ | $\nu_5 = 57.06$ |
| $r_{10} = 3.0318$ | | | |
| | $d_{10} = 0.089$ | | |
| $r_{11} = -1.8134$ | | | |
| | $d_{11} = 0.292$ | $n_6 = 1.78472$ | $\nu_6 = 25.71$ |
| $r_{12} = 0.7306$ | | | |
| | $d_{12} = 0.052$ | | |
| $r_{13} = -33.3245$ | | | |
| | $d_{13} = 0.069$ | $n_7 = 1.62606$ | $\nu_7 = 39.10$ |
| $r_{14} = -0.7187$ | | | |
| | $f_I = -1.633$ | $f_{II} = 1.182$ | $f_{BW} = 1.347$ |

Embodiment 5

| | $f = 1$ | $2\omega = 73.4°$ | |
|---|---|---|---|
| $r_1 = 2.9317$ | | | |
| | $d_1 = 0.153$ | $n_1 = 1.72342$ | $\nu_1 = 37.95$ |
| $r_2 = 0.7299$ | | | |
| | $d_2 = 0.322$ | | |
| $r_3 = 32.6868$ | | | |
| | $d_3 = 0.117$ | $n_2 = 1.69680$ | $\nu_2 = 55.52$ |
| $r_4 = 1.1632$ | | | |
| | $d_4 = 0.050$ | | |
| $r_5 = 1.0146$ | | | |
| | $d_5 = 0.369$ | $n_3 = 1.62606$ | $\nu_3 = 39.10$ |
| $r_6 = -51.3765$ | | | |
| | $d_6 = 0.034 \sim 0.762$ | | |
| $r_7 = 1.5164$ | | | |
| | $d_7 = 0.112$ | $n_4 = 1.62230$ | $\nu_4 = 53.20$ |
| $r_8 = -1.8000$ | | | |
| | $d_8 = 0.014$ | | |
| $r_9 = 0.6930$ | | | |
| | $d_9 = 0.095$ | $n_5 = 1.62230$ | $\nu_5 = 53.20$ |
| $r_{10} = 2.1325$ | | | |
| | $d_{10} = 0.142$ | | |
| $r_{11} = -1.6898$ | | | |
| | $d_{11} = 0.238$ | $n_6 = 1.78472$ | $\nu_6 = 25.71$ |
| $r_{12} = 0.7082$ | | | |
| | $d_{12} = 0.057$ | | |
| $r_{13} = -6.1833$ | | | |
| | $d_{13} = 0.044$ | $n_7 = 1.62230$ | $\nu_7 = 53.20$ |
| $r_{14} = -0.6951$ | | | |
| | $f_I = -1.632$ | $f_{II} = 1.182$ | $f_{BW} = 1.311$ |

Embodiment 6

| | $f = 1$ | $2\omega = 73.4°$ | |
|---|---|---|---|
| $r_1 = 1.5283$ | | | |
| | $d_1 = 0.134$ | $n_1 = 1.80440$ | $\nu_1 = 39.62$ |
| $r_2 = 0.5803$ | | | |
| | $d_2 = 0.284$ | | |
| $r_3 = -1.8201$ | | | |
| | $d_3 = 0.138$ | $n_2 = 1.79952$ | $\nu_2 = 42.24$ |
| $r_4 = 2.4626$ | | | |
| | $d_4 = 0.009$ | | |
| $r_5 = 1.2637$ | | | |
| | $d_5 = 0.172$ | $n_3 = 1.72342$ | $\nu_3 = 37.95$ |

-continued

Embodiment 6

| | f = 1 | 2ω = 73.4° | |
|---|---|---|---|
| $r_6 = -2.6175$ | | | |
| | $d_6 = 0.034 \sim 0.775$ | | |
| $r_7 = 1.9581$ | | | |
| | $d_7 = 0.140$ | $n_4 = 1.61484$ | $\nu_4 = 51.17$ |
| $r_8 = -2.5071$ | | | |
| | $d_8 = 0.014$ | | |
| $r_9 = 0.7430$ | | | |
| | $d_9 = 0.171$ | $n_5 = 1.62374$ | $\nu_5 = 47.10$ |
| $r_{10} = 3.2331$ | | | |
| | $d_{10} = 0.175$ | | |
| $r_{11} = -1.2705$ | | | |
| | $d_{11} = 0.123$ | $n_6 = 1.79177$ | $\nu_6 = 26.22$ |
| $r_{12} = 0.7735$ | | | |
| | $d_{12} = 0.052$ | | |
| $r_{13} = 3.6029$ | | | |
| | $d_{13} = 0.069$ | $n_7 = 1.64268$ | $\nu_7 = 44.88$ |
| $r_{14} = -0.693$ | | | |
| | $f_I = -1.633$ | $f_{II} = 1.182$ | $f_{BW} = 1.343$ |

Embodiment 7

| | f = 1 | 2ω = 73.4° | |
|---|---|---|---|
| $r_1 = 1.5607$ | | | |
| | $d_1 = 0.134$ | $n_1 = 1.80440$ | $\nu_1 = 39.62$ |
| $r_2 = 0.5778$ | | | |
| | $d_2 = 0.293$ | | |
| $r_3 = -1.5359$ | | | |
| | $d_3 = 0.138$ | $n_2 = 1.79952$ | $\nu_2 = 42.24$ |
| $r_4 = 2.6583$ | | | |
| | $d_4 = 0.006$ | | |
| $r_5 = 1.3427$ | | | |
| | $d_5 = 0.172$ | $n_3 = 1.72342$ | $\nu_3 = 37.95$ |
| $r_6 = -1.9997$ | | | |
| | $d_6 = 0.034 \sim 0.733$ | | |
| $r_7 = 1.6325$ | | | |
| | $d_7 = 0.140$ | $n_4 = 1.61484$ | $\nu_4 = 51.17$ |
| $r_8 = -3.1941$ | | | |
| | $d_8 = 0.014$ | | |
| $r_9 = 0.7374$ | | | |
| | $d_9 = 0.172$ | $n_5 = 1.62374$ | $\nu_5 = 47.10$ |
| $r_{10} = 2.8402$ | | | |
| | $d_{10} = 0.167$ | | |
| $r_{11} = -1.3876$ | | | |
| | $d_{11} = 0.123$ | $n_6 = 1.78470$ | $\nu_6 = 26.22$ |
| $r_{12} = 0.7343$ | | | |
| | $d_{12} = 0.052$ | | |
| $r_{13} = 2.7624$ | | | |
| | $d_{13} = 0.069$ | $n_7 = 1.63930$ | $\nu_7 = 44.88$ |
| $r_{14} = -0.725$ | | | |
| | $f_I = -1.633$ | $f_{II} = 1.182$ | $f_{BW} = 1.344$ |

Embodiment 8

| | f = 1 | 2ω = 73.4° | |
|---|---|---|---|
| $r_1 = 1.5837$ | | | |
| | $d_1 = 0.069$ | $n_1 = 1.72600$ | $\nu_1 = 53.56$ |
| $r_2 = 0.5654$ | | | |
| | $d_2 = 0.310$ | | |
| $r_3 = -1.4697$ | | | |
| | $d_3 = 0.067$ | $n_2 = 1.72916$ | $\nu_2 = 54.68$ |
| $r_4 = 2.8766$ | | | |
| | $d_4 = 0.005$ | | |
| $r_5 = 1.2186$ | | | |
| | $d_5 = 0.190$ | $n_3 = 1.60729$ | $\nu_3 = 49.29$ |
| $r_6 = -1.7873$ | | | |
| | $d_6 = 0.034 \sim 0.777$ | | |
| $r_7 = 1.3587$ | | | |
| | $d_7 = 0.279$ | $n_4 = 1.60729$ | $\nu_4 = 49.29$ |
| $r_8 = -1.8865$ | | | |
| | $d_8 = 0.014$ | | |
| $r_9 = 0.6446$ | | | |
| | $d_9 = 0.101$ | $n_5 = 1.61484$ | $\nu_5 = 51.17$ |
| $r_{10} = 2.3631$ | | | |
| | $d_{10} = 0.107$ | | |
| $r_{11} = -2.1009$ | | | |
| | $d_{11} = 0.1837$ | $n_6 = 1.80518$ | $\nu_6 = 25.43$ |
| $r_{12} = 0.6389$ | | | |
| | $d_{12} = 0.086$ | | |
| $r_{13} = -78.4331$ | | | |
| | $d_{13} = 0.077$ | $n_7 = 1.59551$ | $\nu_7 = 39.21$ |
| $r_{14} = -0.7442$ | | | |
| | $f_I = -1.633$ | $f_{II} = 1.182$ | $f_{BW} = 1.293$ | wherein the reference symbols $r_1$ through $r_{14}$ represent radii of curvature on the surfaces of the respective lens components, the reference symbols $d_1$ through $d_{13}$ designate thicknesses of the respective lens elements and airspaces reserved therebetween, the reference symbols $n_1$ through $n_7$ denote refractive indices of the respective lens components, the reference symbols $\nu_1$ through $\nu_7$ represent Abbe's numbers of the respective lens components, the reference symbol 2ω designates angle of field at the wide position, the reference symbol $f_I$ designates focal length of the front lens group, the reference symbol $f_{II}$ denotes focal length of the rear lens group and the reference symbol $f_{BW}$ represents back focal length at the wide position.

Figure 3:
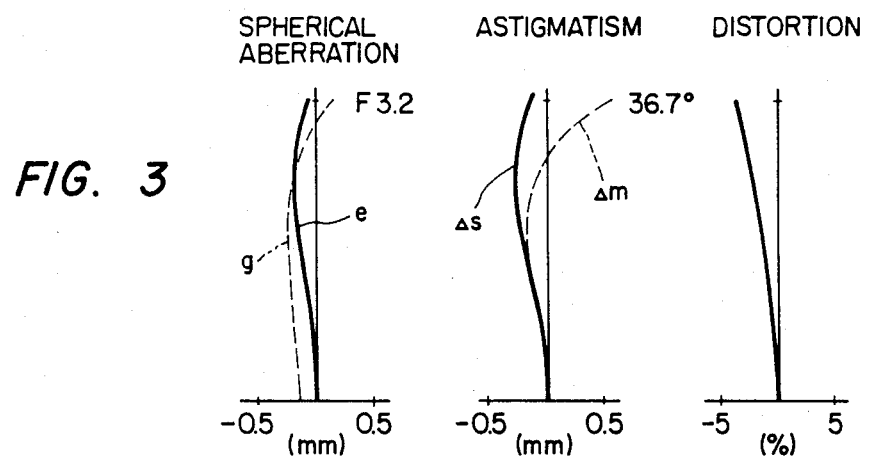
FIG. 3, FIG. 4 and FIG. 5 show graphs illustrating the aberration characteristics of the first embodiment.
Figure 4:
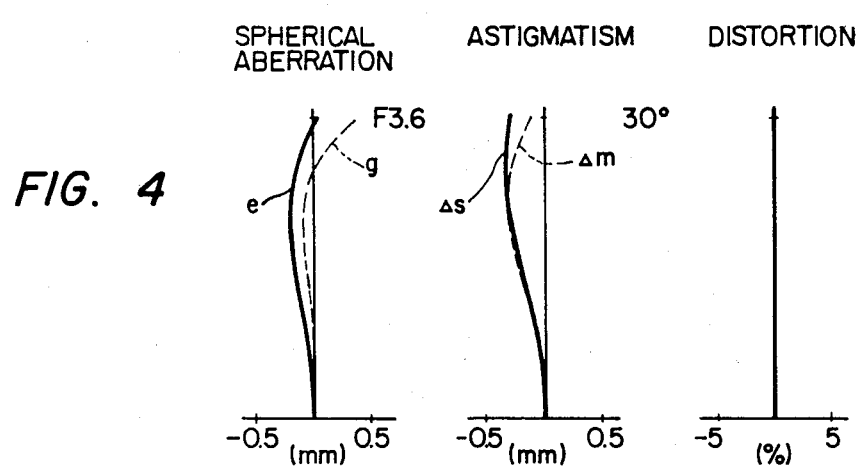
Figure 5:
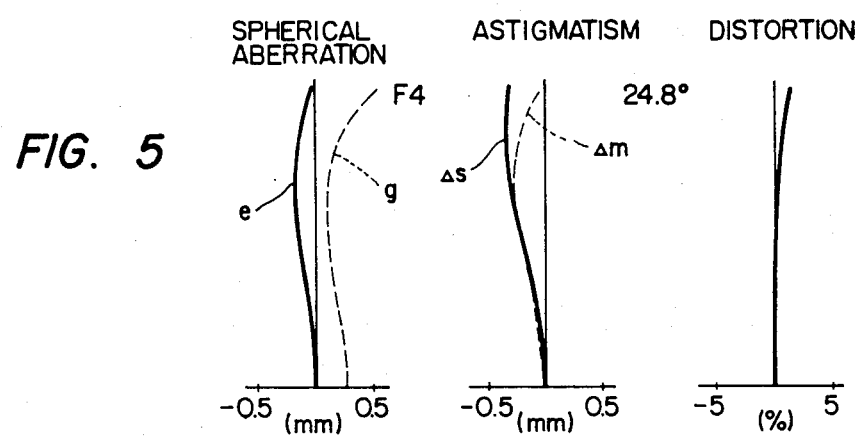
Figure 6:
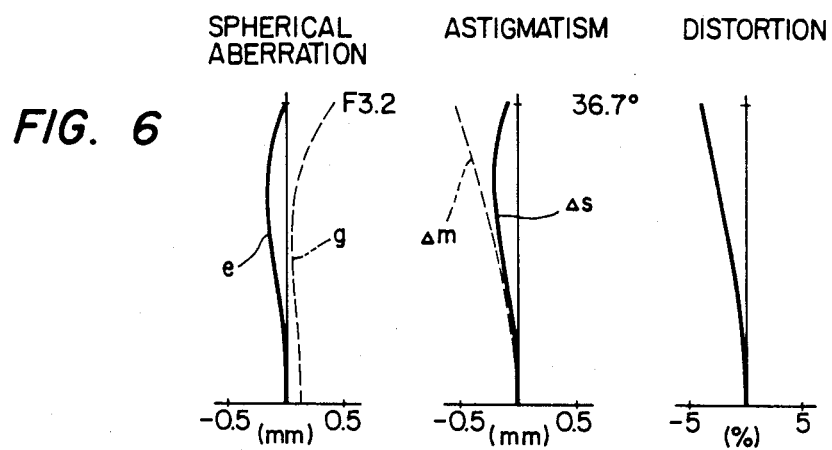
FIG. 6, FIG. 7 and FIG. 8 show graphs illustrating the aberration characteristics of the second embodiment.
Figure 7:
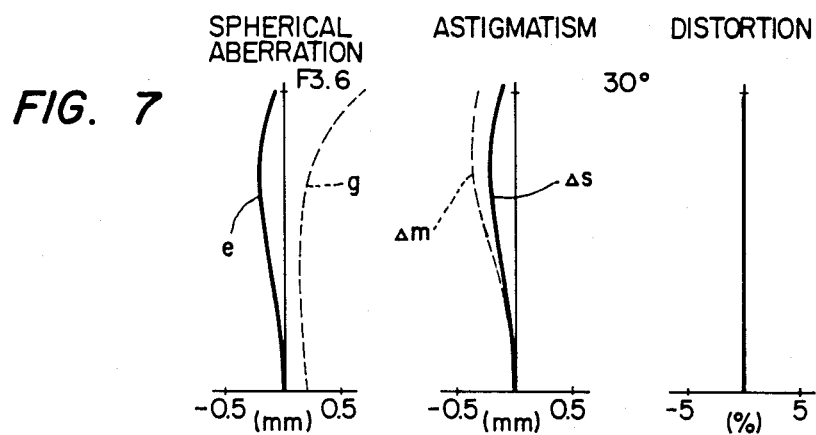
Figure 8:
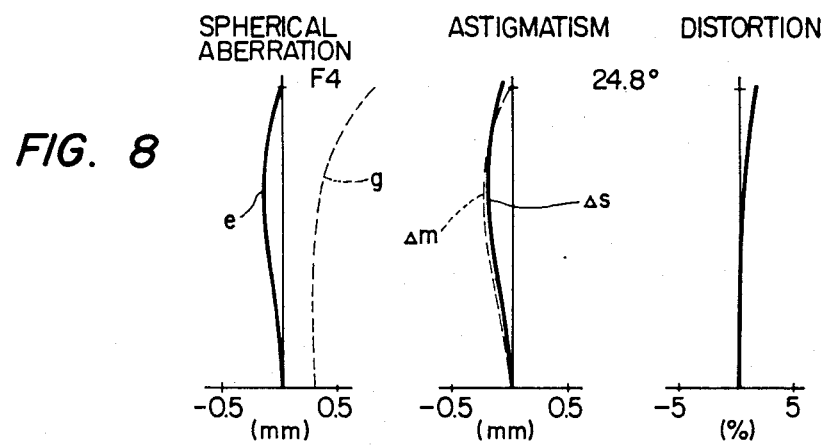
Figure 9:
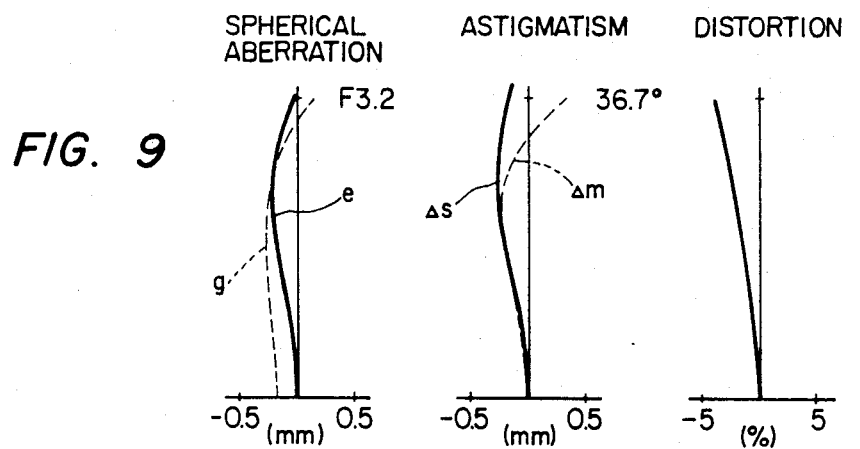
FIG. 9, FIG. 10 and FIG. 11 show graphs illustrating the aberration characteristics of the third embodiment.
Figure 10:
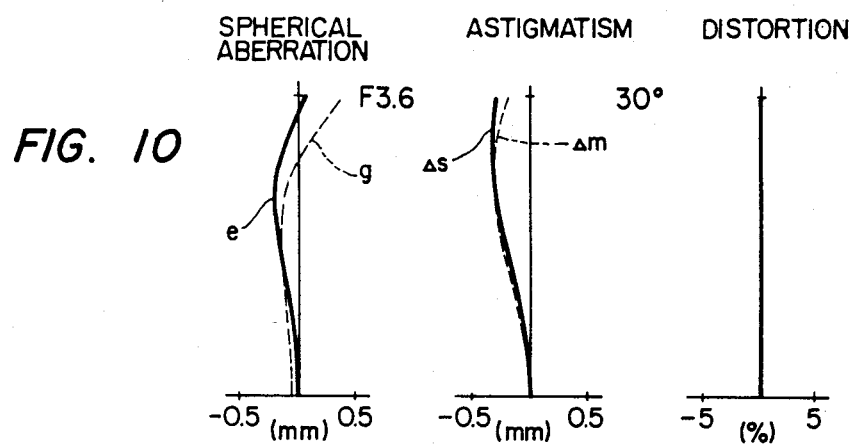
Figure 11:
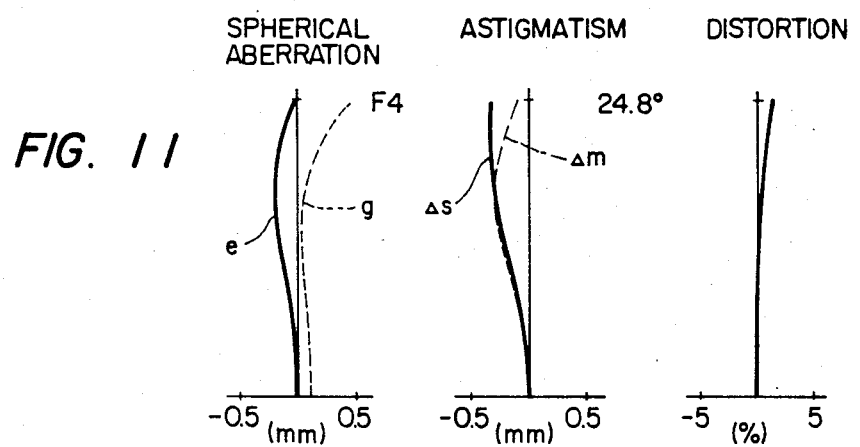
Figure 12:
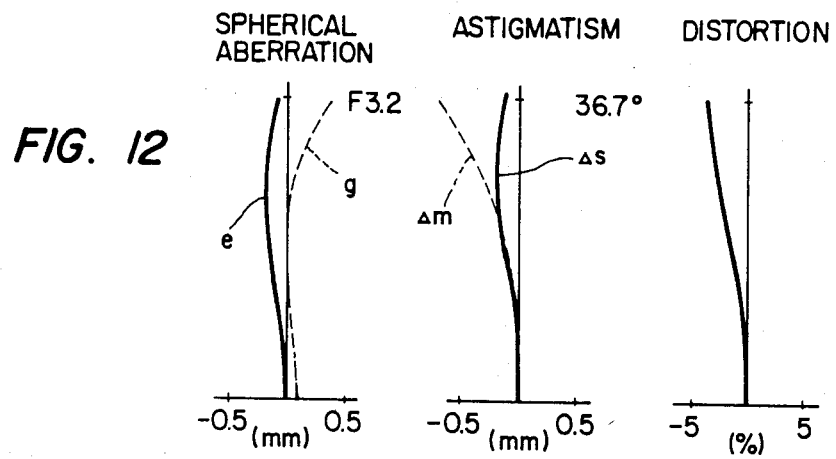
FIG. 12, FIG. 13 and FIG. 14 show curves illustrating the aberration characteristics of the fourth embodiment.
Figure 13:
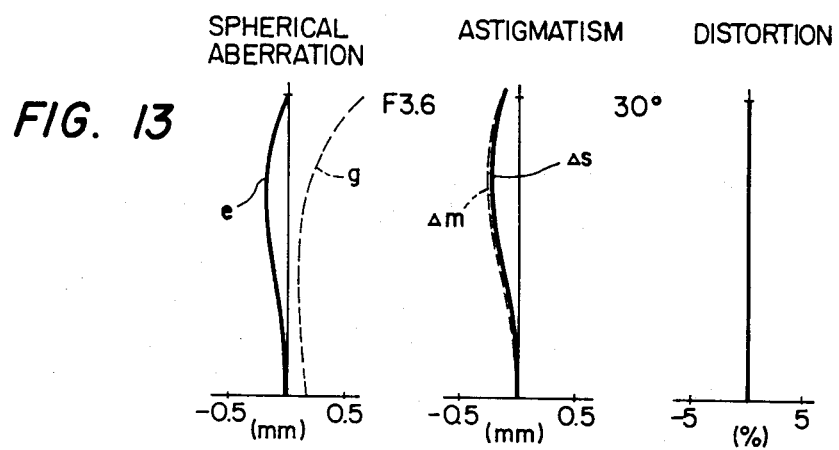
Figure 14:
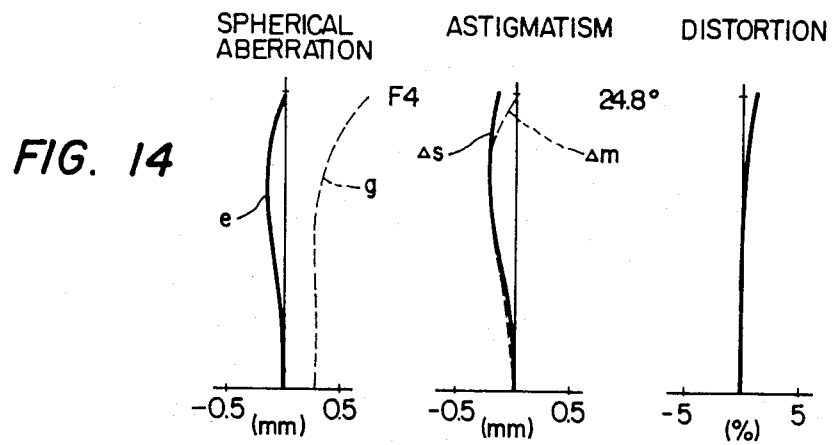
Figure 15:
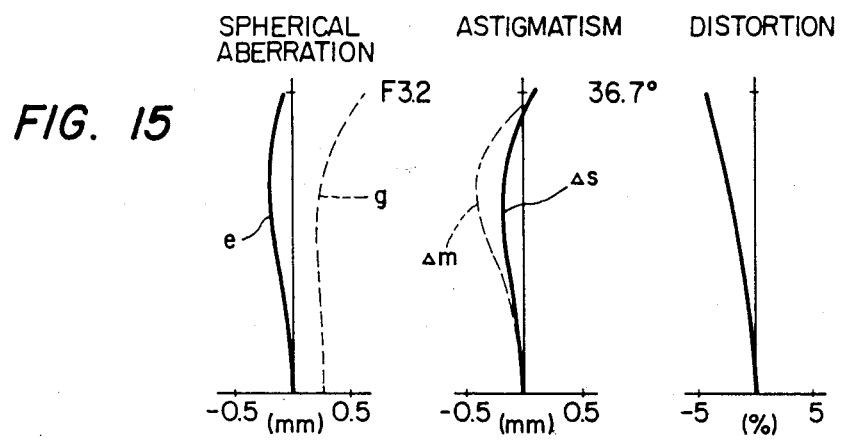
FIG. 15, FIG. 16 and FIG. 17 show curves illustrating the aberration characteristics of the fifth embodiment.
Figure 16:
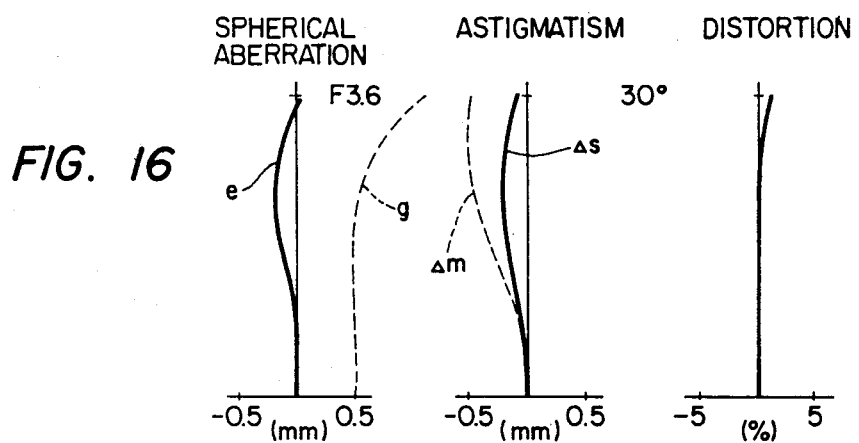
Figure 17:
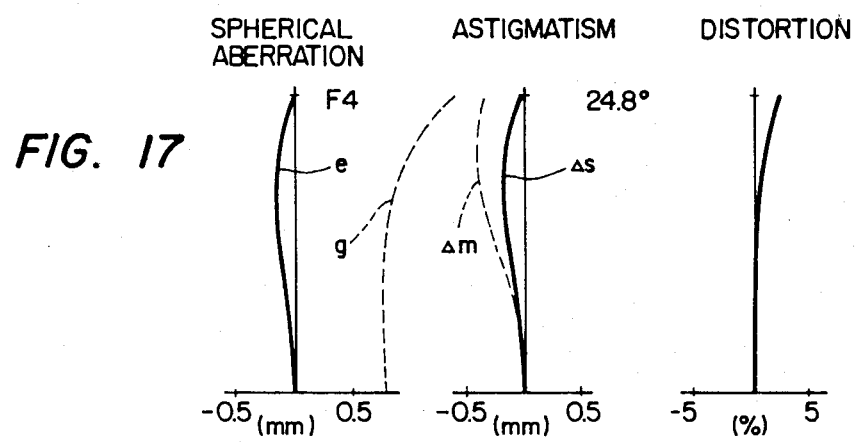
Figure 21:
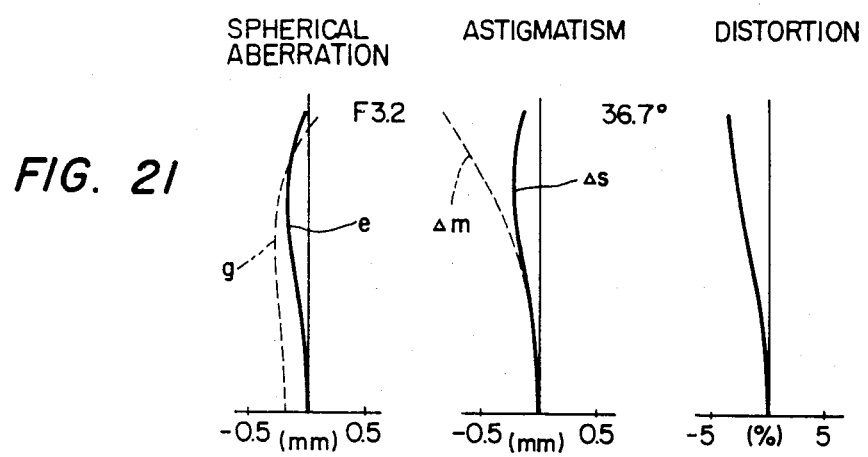
FIG. 21, FIG. 22 and FIG. 23 show graphs illustrating the aberration characteristics of the seventh embodiment.
Figure 22:
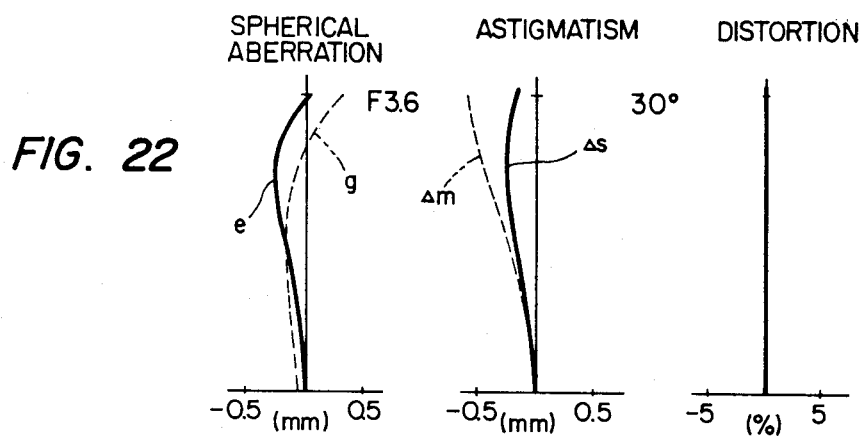
Figure 23:
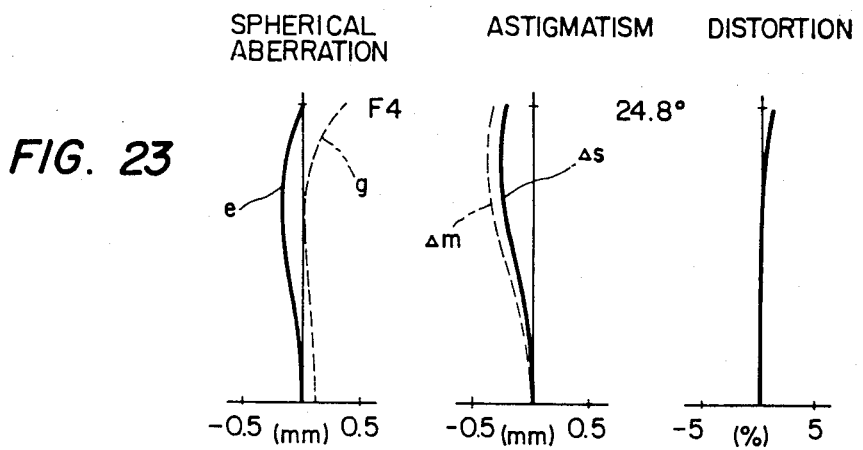
Figure 24:
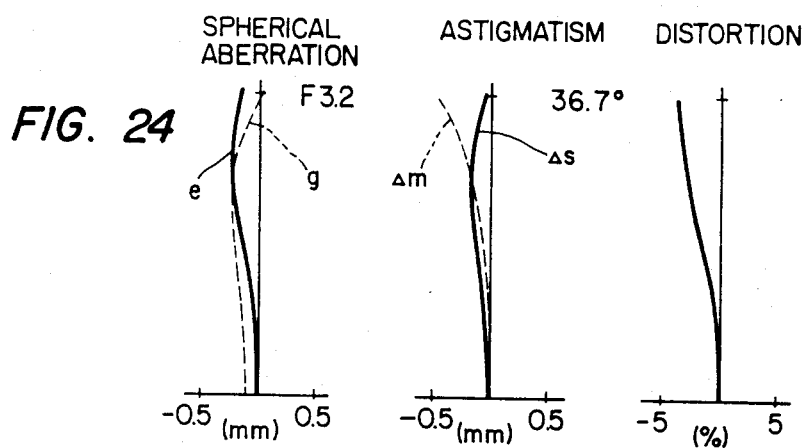
FIG. 24, FIG. 25 and FIG. 26 show graphs illustrating the aberration characteristics of the eighth embodiment.
Figure 25:
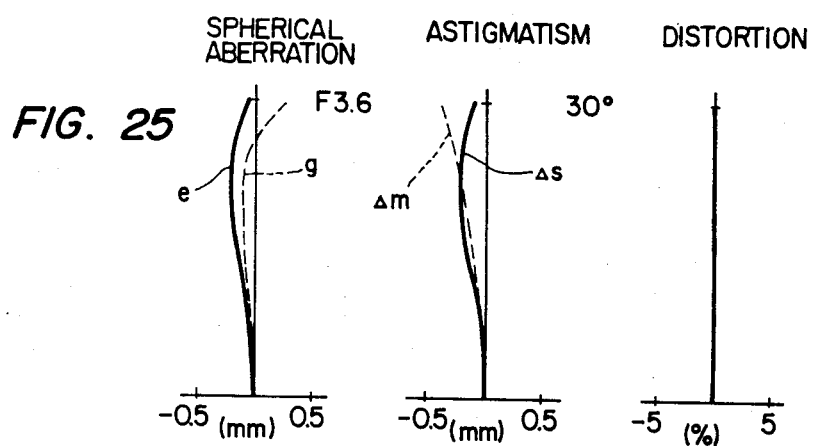
Figure 26:
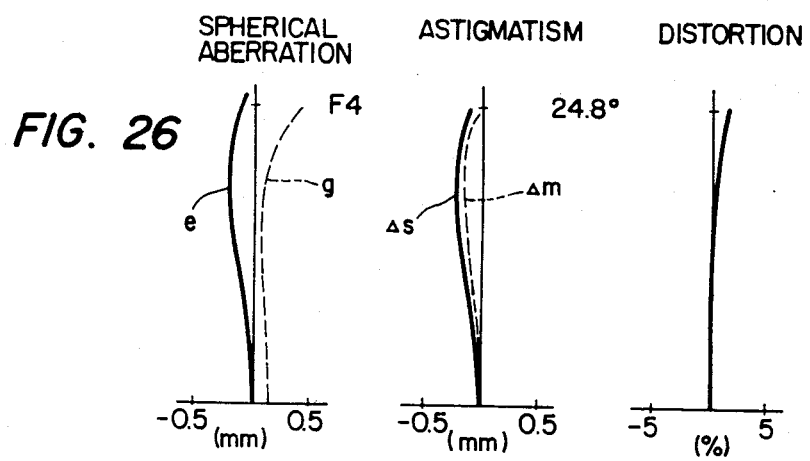

Among the above-mentioned embodiments, the fifth embodiment comprises as the second lens component a negative meniscus lens component having a convex surface on the object side, whereas the other embodiments use as the second lens component a biconcave lens. The aberration characteristics of these embodiments are illustrated in FIG. 3 through FIG. 26; aberration characteristics at a field angle of 73.4° being illustrated in FIG. 3, FIG. 6, FIG. 9, FIG. 12, FIG. 15, FIG. 18, FIG. 21 and FIG. 24, aberration characteristics at a field angle of 60° being illustrated in FIG. 4, FIG. 7, FIG. 10, FIG. 13, FIG. 16, FIG. 19, FIG. 22 and FIG. 25, and aberration characteristics at field angle of 49.6° being illustrated in FIG. 5, FIG. 8, FIG. 11, FIG. 14, FIG. 17, FIG. 20, FIG. 23 and FIG. 26.

As is understood from the foregoing descriptions, the wide-angle zoom lens system according to the present invention has sufficient wide-angle effect and zoom ratio, affords marginal rays in a quantity sufficient even for photographing an object located at the nearmost position, and is compact and light in weight enough to permit using a filter of 49 mm in diameter. In addition, as is understood from FIG. 3 through FIG. 26, aberrations are favorably corrected over the entire range from the center to the marginal portion of the field in the lens system according to the present invention.

I claim:

1. A wide-angle zoom lens system comprising a front lens group comprising a first negative meniscus lens component having a convex surface on the object side, a second negative lens component and a third positive lens component, and a rear lens group comprising a fourth positive lens component, a fifth positive meniscus lens component having a convex surface on the object side, a sixth negative lens component and a seventh positive lens component; said lens system being so adapted as to permit changing focal length of the entire lens system as a whole by varying the airspace reserved between said front and rear lens groups and satisfy the conditions enumerated below:

(1) $1.68 < n_1, n_2$
(2) $n_4, n_5 < 1.65$ (3) $1.75 < n_6$ $$0.43 < \frac{d_1 + d_2 + d_3}{f} < 0.82 \quad (4)$$

(5) $1.6 < |r_6|/f$ wherein the reference symbols $n_1$, $n_2$, $n_4$, $n_5$ and $n_6$ represent refractive indices of the first, second, fourth, fifth and sixth lens components respectively, the reference symbols $d_1$ and $d_3$ designate thicknesses of the first and second lens components respectively, the reference symbol $d_2$ denotes the airspace reserved between the first and second lens components, the reference symbol $r_6$ represents radius of curvature on the image side surface of the third lens component and the reference symbol f designates focal length of the entire lens system as a whole at the wide position.

2. A wide-angle zoom lens system according to claim 1 so adapted as to satisfy the additional conditions enumerated below:

$$0.35 < \frac{d_7 + d_9 + d_{11}}{f} < 0.7 \quad (6)$$

(7) $n_7 < 1.65$
(8) $0.6 < r_9/f < 0.83$
(9) $1 < r_4/r_5 < 2.4$ wherein the reference symbols $d_7$, $d_9$ and $d_{11}$ represent thicknesses of the fourth, fifth and sixth lens components respectively, the reference symbol $n_7$ designates refractive index of the seventh lens component, and the reference symbols $r_4$, $r_5$ and $r_9$ denote radii of curvature on the image side surface of the second lens component, the object side surface of the third lens component and the object side surface of the fifth lens component.

3. A wide-angle zoom lens system according to claim 1 having the following numerical data:

| | $f = 1$ | | $2\omega = 73.4°$ | |
|---|---|---|---|---|
| $r_1 = 1.7061$ | | | | |
| | $d_1 = 0.134$ | $n_1 = 1.80610$ | $\nu_1 = 40.95$ | |
| $r_2 = 0.6154$ | | | | |
| | $d_2 = 0.284$ | | | |
| $r_3 = -2.1733$ | | | | |
| | $d_3 = 0.138$ | $n_2 = 1.80610$ | $\nu_2 = 40.95$ | |
| $r_4 = 2.2662$ | | | | |
| | $d_4 = 0.025$ | | | |
| $r_5 = 1.3015$ | | | | |
| | $d_5 = 0.155$ | $n_3 = 1.72342$ | $\nu_3 = 37.95$ | |
| $r_6 = -2.9799$ | | | | |
| | $d_6 = 0.034 \sim 0.772$ | | | |
| $r_7 = 1.4473$ | | | | |
| | $d_7 = 0.306$ | $n_4 = 1.62012$ | $\nu_4 = 49.66$ | |
| $r_8 = -2.3949$ | | | | |
| | $d_8 = 0.014$ | | | |
| $r_9 = 0.6876$ | | | | |
| | $d_9 = 0.123$ | $n_5 = 1.62374$ | $\nu_5 = 47.10$ | |
| $r_{10} = 2.3736$ | | | | |
| | $d_{10} = 0.116$ | | | |
| $r_{11} = -1.7497$ | | | | |
| | $d_{11} = 0.173$ | $n_6 = 1.78470$ | $\nu_6 = 26.22$ | |
| $r_{12} = 0.7017$ | | | | |
| | $d_{12} = 0.052$ | | | |
| $r_{13} = 7.1837$ | | | | |
| | $d_{13} = 0.069$ | $n_7 = 1.61340$ | $\nu_7 = 43.84$ | |
| $r_{14} = -0.7438$ | | | | |
| | $f_I = -1.633$ | $f_{II} = 1.182$ | $f_{BW} = 1.329$ | | wherein the reference symbols $r_1$ through $r_{14}$ represent radii of curvature on the surfaces of the respective lens components, the reference symbols $d_1$ through $d_{13}$ designate thicknesses of the respective lens components and the airspaces reserved therebetween, the reference symbols $n_1$ through $n_7$ denote refractive indices of the respective lens components, the reference symbols $\nu_1$ through $\nu_7$ represents Abbe's numbers of the respective lens components, the reference symbol $f_I$ designates focal length of the front lens group, the reference symbol $f_{II}$ denotes focal length of the rear lens group, the reference symbol $2\omega$ represents angle of field and the reference symbol $f_{BW}$ designates back focal length at the wide position.

4. A wide-angle zoom lens system according to claim 1 having the following numerical data:

| | $f = 1$ | | $2\omega = 73.4°$ | |
|---|---|---|---|---|
| $r_1 = 2.0924$ | | | | |
| | $d_1 = 0.152$ | $n_1 = 1.74400$ | $\nu_1 = 44.73$ | |
| $r_2 = 0.6377$ | | | | |
| | $d_2 = 0.250$ | | | |
| $r_3 = -2.4324$ | | | | |
| | $d_3 = 0.172$ | $n_2 = 1.73400$ | $\nu_2 = 51.45$ | |
| $r_4 = 1.6607$ | | | | |
| | $d_4 = 0.040$ | | | |
| $r_5 = 1.2417$ | | | | |
| | $d_5 = 0.155$ | $n_3 = 1.72342$ | $\nu_3 = 37.95$ | |
| $r_6 = -3.4749$ | | | | |
| | $d_6 = 0.034 \sim 0.761$ | | | |
| $r_7 = 1.6372$ | | | | |
| | $d_7 = 0.196$ | $n_4 = 1.62330$ | $\nu_4 = 53.20$ | |
| $r_8 = -1.9165$ | | | | |
| | $d_8 = 0.0139$ | | | |
| $r_9 = 0.7335$ | | | | |
| | $d_9 = 0.101$ | $n_5 = 1.62299$ | $\nu_5 = 58.14$ | |
| $r_{10} = 3.2318$ | | | | |
| | $d_{10} = 0.101$ | | | |
| $r_{11} = -1.6623$ | | | | |
| | $d_{11} = 0.287$ | $n_6 = 1.78470$ | $\nu_6 = 26.22$ | |
| $r_{12} = 0.7394$ | | | | |
| | $d_{12} = 0.052$ | | | |
| $r_{13} = -17.2781$ | | | | |
| | $d_{13} = 0.069$ | $n_7 = 1.61340$ | $\nu_7 = 43.84$ | |
| $r_{14} = -0.6832$ | | | | |
| | $f_I = -1.633$ | $f_{II} = 1.182$ | $f_{BW} = 1.339$ | | wherein the reference symbols $r_1$ through $r_{14}$ represent radii of curvature on the surfaces of the respective lens components, the reference symbols $d_1$ through $d_{13}$ designate thicknesses of the respective lens components and the airspaces reserved therebetween, the reference symbols $n_1$ through $n_7$ denote refractive indices of the respective lens components, the reference symbols $\nu_1$ through $\nu_7$ represents Abbe's numbers of the respective lens components, the reference symbol $f_I$ designates focal length of the front lens group, the reference symbol $f_{II}$ denotes focal length of the rear lens group, the reference symbol $2\omega$ represents angle of field and the reference symbol $f_{BW}$ designates back focal length at the wide position.

5. A wide-angle zoom lens system according to claim 1 having the following numerical data:

| | $f = 1$ | | $2\omega = 73.4°$ | |
|---|---|---|---|---|
| $r_1 = 1.7925$ | | | | |
| | $d_1 = 0.134$ | $n_1 = 1.79952$ | $\nu_1 = 42.24$ | |
| $r_2 = 0.6226$ | | | | |
| | $d_2 = 0.289$ | | | |
| $r_3 = -2.2268$ | | | | |
| | $d_3 = 0.138$ | $n_2 = 1.79952$ | $\nu_2 = 42.24$ | |
| $r_4 = 2.2176$ | | | | |
| | $d_4 = 0.026$ | | | |
| $r_5 = 1.3072$ | | | | |
| | $d_5 = 0.155$ | $n_3 = 1.72342$ | $\nu_3 = 37.95$ | |
| $r_6 = -3.0081$ | | | | |
| | $d_6 = 0.034 \sim 0.739$ | | | |

-continued

| | f = 1 | 2ω = 73.4° | |
|---|---|---|---|
| $r_7 = 1.4045$ | | | |
| | $d_7 = 0.307$ | $n_4 = 1.62012$ | $\nu_4 = 49.66$ |
| $r_8 = -2.5521$ | | | |
| | $d_8 = 0.014$ | | |
| $r_9 = 0.7186$ | | | |
| | $d_9 = 0.123$ | $n_5 = 1.63303$ | $\nu_5 = 47.10$ |
| $r_{10} = 2.8869$ | | | |
| | $d_{10} = 0.120$ | | |
| $r_{11} = -1.5473$ | | | |
| | $d_{11} = 0.172$ | $n_6 = 1.80603$ | $\nu_6 = 26.22$ |
| $r_{12} = 0.7323$ | | | |
| | $d_{12} = 0.052$ | | |
| $r_{13} = 12.8440$ | | | |
| | $d_{13} = 0.069$ | $n_7 = 1.63930$ | $\nu_7 = 44.88$ |
| $r_{14} = -0.7237$ | | | |
| | $f_I = -1.633$ | $f_{II} = 1.182$ | $f_{BW} = 1.332$ | wherein the reference symbols $r_1$ through $r_{14}$ represent radii of curvature on the surfaces of the respective lens components, the reference symbols $d_1$ through $d_{13}$ designate thicknesses of the respective lens components and the airspaces reserved therebetween, the reference symbols $n_1$ through $n_7$ denote refractive indices of the respective lens components, the reference symbols $\nu_1$ through $\nu_7$ represent Abbe's numbers of the respective lens components, the reference symbol $f_I$ designates focal length of the front lens group, the reference symbol $f_{II}$ denotes focal length of the rear lens group, the reference symbol $2\omega$ represents angle of field and the reference symbol $f_{BW}$ designates back focal length at the wide position.

6. A wide-angle zoom lens system according to claim 1 having the following numerical data:

| | f = 1 | 2ω = 73.4° | |
|---|---|---|---|
| $r_1 = 1.7093$ | | | |
| | $d_1 = 0.152$ | $n_1 = 1.78590$ | $\nu_1 = 44.18$ |
| $r_2 = 0.6094$ | | | |
| | $d_2 = 0.255$ | | |
| $r_3 = -1.8798$ | | | |
| | $d_3 = 0.155$ | $n_2 = 1.75700$ | $\nu_2 = 47.87$ |
| $r_4 = 1.9607$ | | | |
| | $d_4 = 0.034$ | | |
| $r_5 = 1.3051$ | | | |
| | $d_5 = 0.155$ | $n_3 = 1.72342$ | $\nu_3 = 37.95$ |
| $r_6 = -2.6389$ | | | |
| | $d_6 = 0.034 \sim 0.765$ | | |
| $r_7 = 1.5830$ | | | |
| | $d_7 = 0.209$ | $n_4 = 1.62230$ | $\nu_4 = 53.20$ |
| $r_8 = -1.9994$ | | | |
| | $d_8 = 0.014$ | | |
| $r_9 = 0.729$ | | | |
| | $d_9 = 0.101$ | $n_5 = 1.62280$ | $\nu_5 = 57.06$ |
| $r_{10} = 3.0318$ | | | |
| | $d_{10} = 0.089$ | | |
| $r_{11} = -1.8134$ | | | |
| | $d_{11} = 0.292$ | $n_6 = 1.78472$ | $\nu_6 = 25.71$ |
| $r_{12} = 0.7306$ | | | |
| | $d_{12} = 0.052$ | | |
| $r_{13} = -33.3245$ | | | |
| | $d_{13} = 0.069$ | $n_7 = 1.62606$ | $\nu_7 = 39.10$ |
| $r_{14} = -0.7187$ | | | |
| | $f_I = -1.633$ | $f_{II} = 1.182$ | $f_{BW} = 1.347$ | wherein the reference symbols $r_1$ through $r_{14}$ represent radii of curvature on the surfaces of the respective lens components, the reference symbols $d_1$ through $d_{13}$ designate thicknesses of the respective lens components and the airspaces reserved therebetween, the reference symbols $n_1$ through $n_7$ denote refractive indices of the respective lens components, the reference symbols $\nu_1$ through $\nu_7$ represent Abbe's numbers of the respective lens components, the reference symbol $f_I$ designates focal length of the front lens group, the reference symbol $f_{II}$ denotes focal length of the rear lens group, the reference symbol $2\omega$ represents angle of field and the reference symbol $f_{BW}$ designates back focal length at the wide position.

7. A wide-angle zoom lens system according to claim 1 having the following numerical data:

| | f = 1 | 2ω = 73.4° | |
|---|---|---|---|
| $r_1 = 2.9317$ | | | |
| | $d_1 = 0.153$ | $n_1 = 1.72342$ | $\nu_1 = 37.95$ |
| $r_2 = 0.7299$ | | | |
| | $d_2 = 0.322$ | | |
| $r_3 = 32.6868$ | | | |
| | $d_3 = 0.117$ | $n_2 = 1.69680$ | $\nu_2 = 55.52$ |
| $r_4 = 1.1632$ | | | |
| | $d_4 = 0.050$ | | |
| $r_5 = 1.0146$ | | | |
| | $d_5 = 0.369$ | $n_3 = 1.62606$ | $\nu_3 = 39.10$ |
| $r_6 = -51.3765$ | | | |
| | $d_6 = 0.034 \sim 0.762$ | | |
| $r_7 = 1.5164$ | | | |
| | $d_7 = 0.112$ | $n_4 = 1.62230$ | $\nu_4 = 53.20$ |
| $r_8 = -1.8000$ | | | |
| | $d_8 = 0.014$ | | |
| $r_9 = 0.6930$ | | | |
| | $d_9 = 0.095$ | $n_5 = 1.62230$ | $\nu_5 = 53.20$ |
| $r_{10} = 2.1325$ | | | |
| | $d_{10} = 0.142$ | | |
| $r_{11} = -1.6898$ | | | |
| | $d_{11} = 0.238$ | $n_6 = 1.78472$ | $\nu_6 = 25.71$ |
| $r_{12} = 0.7082$ | | | |
| | $d_{12} = 0.057$ | | |
| $r_{13} = -6.1833$ | | | |
| | $d_{13} = 0.044$ | $n_7 = 1.62230$ | $\nu_7 = 53.20$ |
| $r_{14} = -0.6951$ | | | |
| | $f_I = -1.632$ | $f_{II} = 1.182$ | $f_{BW} = 1.311$ | wherein the reference symbols $r_1$ through $r_{14}$ represent radii of curvature on the surfaces of the respective lens components, the reference symbols $d_1$ through $d_{13}$ designate thicknesses of the respective lens components and the airspaces reserved therebetween, the reference symbols $n_1$ through $n_7$ denote refractive indices of the respective lens components, the reference symbols $\nu_1$ through $\nu_7$ represent Abbe's numbers of the respective lens components, the reference symbol $f_I$ designates focal length of the front lens group, the reference symbol $f_{II}$ denotes focal length of the rear lens group, the reference symbol $2\omega$ represents angle of field and the reference symbol $f_{BW}$ designates back focal length at the wide position.

8. A wide-angle zoom lens system according to claim 1 having the following numerical data:

| | f = 1 | 2ω = 73.4° | |
|---|---|---|---|
| $r_1 = 1.5283$ | | | |
| | $d_1 = 0.134$ | $n_1 = 1.80440$ | $\nu_1 = 39.62$ |
| $r_2 = 0.5803$ | | | |
| | $d_2 = 0.284$ | | |
| $r_3 = -1.8201$ | | | |
| | $d_3 = 0.138$ | $n_2 = 1.79952$ | $\nu_2 = 42.24$ |
| $r_4 = 2.4626$ | | | |
| | $d_4 = 0.009$ | | |
| $r_5 = 1.2637$ | | | |
| | $d_5 = 0.172$ | $n_3 = 1.72342$ | $\nu_3 = 37.95$ |
| $r_6 = -2.6175$ | | | |
| | $d_6 = 0.034 \sim 0.775$ | | |
| $r_7 = 1.9581$ | | | |
| | $d_7 = 0.140$ | $n_4 = 1.61484$ | $\nu_4 = 51.17$ |
| $r_8 = -2.5071$ | | | |
| | $d_8 = 0.014$ | | |
| $r_9 = 0.7430$ | | | |

-continued

| | $f = 1$ | | $2\omega = 73.4°$ | |
|---|---|---|---|---|
| $r_{10} = 3.2331$ | $d_9 = 0.171$ | $n_5 = 1.62374$ | $\nu_5 = 47.10$ | |
| $r_{11} = -1.2705$ | $d_{10} = 0.175$ | | | |
| $r_{12} = 0.7735$ | $d_{11} = 0.123$ | $n_6 = 1.79177$ | $\nu_6 = 26.22$ | |
| $r_{13} = 3.6029$ | $d_{12} = 0.052$ | | | |
| $r_{14} = -0.693$ | $d_{13} = 0.069$ | $n_7 = 1.64268$ | $\nu_7 = 44.88$ | |
| | $f_I = -1.633$ | $f_{II} = 1.182$ | $f_{BW} = 1.343$ | | wherein the reference symbols $r_1$ through $r_{14}$ represent radii of curvature on the surfaces of the respective lens components, the reference symbols $d_1$ through $d_{13}$ designate thicknesses of the respective lens components and the airspaces reserved therebetween, the reference symbols $n_1$ through $n_7$ denote refractive indices of the respective lens components, the reference symbols $\nu_1$ through $\nu_7$ represent Abbe's numbers of the respective lens components, the reference symbol $f_I$ designates focal length of the front lens group, the reference symbol $f_{II}$ denotes focal length of the rear lens group, the reference symbol $2\omega$ represents angle of field and the reference symbol $f_{BW}$ designates back focal length at the wide position.

9. A wide-angle zoom lens system according to claim 1 having the following numerical data:

| | $f = 1$ | | $2\omega = 73.4°$ | |
|---|---|---|---|---|
| $r_1 = 1.5607$ | $d_1 = 0.134$ | $n_1 = 1.80440$ | $\nu_1 = 39.62$ | |
| $r_2 = 0.5778$ | $d_2 = 0.293$ | | | |
| $r_3 = -1.5359$ | $d_3 = 0.138$ | $n_2 = 1.79952$ | $\nu_2 = 42.24$ | |
| $r_4 = 2.6583$ | $d_4 = 0.006$ | | | |
| $r_5 = 1.3427$ | $d_5 = 0.172$ | $n_3 = 1.72342$ | $\nu_3 = 37.95$ | |
| $r_6 = -1.9997$ | $d_6 = 0.034 \sim 0.733$ | | | |
| $r_7 = 1.6325$ | $d_7 = 0.140$ | $n_4 = 1.61484$ | $\nu_4 = 51.17$ | |
| $r_8 = -3.1941$ | $d_8 = 0.014$ | | | |
| $r_9 = 0.7374$ | $d_9 = 0.172$ | $n_5 = 1.62374$ | $\nu_5 = 47.10$ | |
| $r_{10} = 2.8402$ | $d_{10} = 0.167$ | | | |
| $r_{11} = -1.3876$ | $d_{11} = 0.123$ | $n_6 = 1.78470$ | $\nu_6 = 26.22$ | |
| $r_{12} = 0.7343$ | $d_{12} = 0.052$ | | | |
| $r_{13} = 2.7624$ | $d_{13} = 0.069$ | $n_7 = 1.63930$ | $\nu_7 = 44.88$ | |
| $r_{14} = -0.725$ | | | | |
| | $f_I = -1.633$ | $f_{II} = 1.182$ | $f_{BW} = 1.344$ | | wherein the reference symbols $r_1$ through $r_{14}$ represent radii of curvature on the surfaces of the respective lens components, the reference symbols $d_1$ through $d_{13}$ designate thicknesses of the respective lens components and the airspaces reserved therebetween, the reference symbols $n_1$ through $n_7$ denote refractive indices of the respective lens components, the reference symbols $\nu_1$ through $\nu_7$ represent Abbe's numbers of the respective lens components, the reference symbol $f_I$ designates focal length of the front lens group, the reference symbol $f_{II}$ denotes focal length of the rear lens group, the reference symbol $2\omega$ represents angle of field and the reference symbol $f_{BW}$ designates back focal length at the wide position.

10. A wide-angle zoom lens system according to claim 1 having the following numerical data:

| | $f = 1$ | | $2\omega = 73.4°$ | |
|---|---|---|---|---|
| $r_1 = 1.5837$ | $d_1 = 0.069$ | $n_1 = 1.72600$ | $\nu_1 = 53.56$ | |
| $r_2 = 0.5654$ | $d_2 = 0.310$ | | | |
| $r_3 = -1.4697$ | $d_3 = 0.067$ | $n_2 = 1.72916$ | $\nu_2 = 54.68$ | |
| $r_4 = 2.8766$ | $d_4 = 0.005$ | | | |
| $r_5 = 1.2186$ | $d_5 = 0.190$ | $n_3 = 1.60729$ | $\nu_3 = 49.29$ | |
| $r_6 = -1.7873$ | $d_6 = 0.034 \sim 0.777$ | | | |
| $r_7 = 1.3587$ | $d_7 = 0.279$ | $n_4 = 1.60729$ | $\nu_4 = 49.29$ | |
| $r_8 = -1.8865$ | $d_8 = 0.014$ | | | |
| $r_9 = 0.6446$ | $d_9 = 0.101$ | $n_5 = 1.61484$ | $\nu_5 = 51.17$ | |
| $r_{10} = 2.3631$ | $d_{10} = 0.107$ | | | |
| $r_{11} = -2.1009$ | $d_{11} = 0.1837$ | $n_6 = 1.80518$ | $\nu_6 = 25.43$ | |
| $r_{12} = 0.6389$ | $d_{12} = 0.086$ | | | |
| $r_{13} = -78.4331$ | $d_{13} = 0.077$ | $n_7 = 1.59551$ | $\nu_7 = 39.21$ | |
| $r_{14} = -0.7442$ | | | | |
| | $f_I = -1.633$ | $f_{II} = 1.182$ | $f_{BW} = 1.293$ | | wherein the reference symbols $r_1$ through $r_{14}$ represent radii of curvature on the surfaces of the respective lens components, the reference symbols $d_1$ through $d_{13}$ designate thicknesses of the respective lens components and the airspaces reserved therebetween, the reference symbols $n_1$ through $n_7$ denote refractive indices of the respective lens components, the reference symbols $\nu_1$ through $\nu_7$ represent Abbe's numbers of the respective lens components, the reference symbol $f_I$ designates focal length of the front lens group, the reference symbol $f_{II}$ denotes focal length of the rear lens group, the reference symbol $2\omega$ represents angle of field and the reference symbol $f_{BW}$ designates back focal length at the wide position.

* * * * *